United States Patent [19]
Mahurin

[11] Patent Number: 6,122,651
[45] Date of Patent: Sep. 19, 2000

[54] METHOD AND APPARATUS FOR PERFORMING OVERSHIFTED ROTATE THROUGH CARRY INSTRUCTIONS BY SHIFTING IN OPPOSITE DIRECTIONS

[75] Inventor: Eric W. Mahurin, Austin, Tex.

[73] Assignee: Advanced Micro Devices, Inc., Sunnyvale, Calif.

[21] Appl. No.: 09/057,055

[22] Filed: Apr. 8, 1998

[51] Int. Cl.[7] .................................................. G06F 7/00
[52] U.S. Cl. ..................... 708/209; 708/495; 708/497; 708/498; 708/504
[58] Field of Search .................... 708/209, 495, 708/497, 498, 504; 712/1–43, 200

[56] References Cited

U.S. PATENT DOCUMENTS

| | | | |
|---|---|---|---|
| 4,472,788 | 9/1984 | Yamazaki | 708/209 |
| 4,490,809 | 12/1984 | Ueda et al. | 377/73 |
| 4,631,703 | 12/1986 | Sakamoto | 377/64 |
| 4,831,571 | 5/1989 | Tokumaru | 708/209 |
| 4,839,839 | 6/1989 | Tokumaru et al. | 708/209 |
| 5,262,971 | 11/1993 | Yamaguchi | 708/209 |
| 5,379,240 | 1/1995 | Byrne | 708/209 |
| 5,553,010 | 9/1996 | Tanihira et al. | 708/209 |
| 5,652,718 | 7/1997 | Thomson | 708/209 |
| 5,671,166 | 9/1997 | Omote | 708/209 |
| 5,682,339 | 10/1997 | Tam | 708/209 |
| 5,696,954 | 12/1997 | Guttag | 712/221 |
| 5,726,926 | 3/1998 | Makino | 708/505 |
| 5,822,231 | 10/1998 | Wong et al. | 708/209 |
| 5,844,828 | 12/1998 | Fujimura et al. | 708/209 |
| 5,991,786 | 11/1999 | Mahurin | 708/209 |
| 6,006,244 | 12/1999 | Mahurin | 708/209 |

*Primary Examiner*—John A. Follansbee
*Assistant Examiner*—Stacy Whitmore
*Attorney, Agent, or Firm*—Conley, Rose & Tayon, PC; B. Noel Kivlin

[57] ABSTRACT

Disclosed is a method and circuit for executing an overshifted rotate through carry instruction. The circuit and method generates an n-bit output operand and output carry flag which represents a result of rotating a combination of a first n-bit operand and a first carry flag by a selected number of bit positions in a selected direction. The selected number of bit positions correspond to a z-bit count. The n-bit output operand and output carry flag is generated by first rotating the combination of the first n-bit operand and the first carry flag in the selected direction by a first number of bit positions corresponding to the y significant bits of the z-bit rotation count. This results in a second n-bit operand and a second carry flag. Thereafter, a combination of the second n-bit operand and the second carry flag is rotated in a direction opposite of the selected direction by second number of bit positions corresponding to the x most significant bits of the z-bit rotation count. This results in the n-bit output operand and output carry flag.

14 Claims, 4 Drawing Sheets

METHOD AND APPARATUS FOR PERFORMING OVERSHIFTED ROTATE THROUGH CARRY INSTRUCTIONS BY SHIFTING IN OPPOSITE DIRECTIONS

BACKGROUND OF THE INVENTION

1. Field of the Invention

This invention relates to arithmetic logic units, and more particularly to a method and circuit for performing overshifted rotate through carry instructions.

2. Description of the Relevant Art

Microprocessors determine the speed and power of personal computers, and a growing number of more powerful machines, by handling most of the data processing in the machine. Microprocessors typically include at least three functional groups: the input/output (I/O) unit, the control unit, and the arithmetic logic (ALU) unit. The I/O unit interfaces between external circuitry and the ALU and the control unit. I/O units frequently include signal buffers for increasing the current capacity of the signal before the signal is sent to external components. The control unit controls the operation of the microprocessor by fetching instructions from the I/O unit and translating the instructions into a form that can be understood by the ALU. In addition, the control unit keeps track of which step of the control unit is being executed. The ALU handles the mathematical computations and logical operations that are performed by the microprocessor. The ALU executes the decoded instructions received from the control unit to modify data contained in registers within the processor.

Essential components of most ALUs include circuitry for performing overshifted rotate through carry instructions. Rotate through carry instructions are divided into two types: rotate through carry left (RCL) and rotate through carry right (RCR). These instructions typically use a single bit carry flag as part of the rotation process in rotating an operand. In prior art ALUs, rotate through carry instructions required C cycles to complete, wherein C is the rotation count of the instruction. The RCL, in the first instruction cycle, shifts the carry flag into the least significant bit of the operand and shifts the most significant bit of the operand into the carry flag. The cycle is then repeated C times. Similarly, the RCR, in the first instruction cycle, shifts the carry flag into the most significant bit of the operand and shifts the least significant bit into the carry flag. The process is repeated C times.

Typical RCL and RCR instructions are formatted as follows:

(1) RCL $A_{n-1:0}, C_{z-1:0}$ (2) RCR $A_{n-1:0}, C_{z-1:0}$, where $A_{n-1}$ is the operand to be rotated and C is the rotation count. It is noted that the carry flag is not identified within the above instructions. However, it is presumed that the carry flag is involved in the execution of the rotate through carry instruction. The carry flag is typically stored within a dedicated register.

In normal rotate through carry instructions, the decimal equivalent of C is less than or equal to n, the number of bits or size of operand A. However, the decimal equivalent of C can be greater than n. When this occurs, the rotate through carry instruction is deemed "overshifted."

The prior art provides two methods for performing an overshifted rotate through carry instruction. The first method was briefly discussed above. In this first method, the prior art needs C cycles to complete an overshifted rotate through carry instruction, wherein each cycle involves shifting, the carry flag into either the least significant or most significant bit of the operand and shifting either the most significant or least significant bit of the operand into the carry flag, depending upon whether the rotation is in the left or right direction. This method is disadvantageous in that a significant amount processor time will be required to execute an overshifted rotate through carry having a large C.

In the second prior art method, the number of cycles needed to complete the overshifted instruction can be reduced when compared to the first method, given identical instruction parameters. Accordingly, this second prior art procedure is faster when compared to the first prior art method. The second method is performed by modifying the original overshifted rotate through carry instruction. In particular, modification involves first comparing rotation count C against n, the size of the operand to be rotated. If the rotation count is greater, the rotation count is divided down under the theory that rotating the combination of the operand and carry flag by (n+1) bit positions, results in the original operand and carry flag. Thus, in this second method, the rotation count is, in effect, divided by (n+1), with a new rotation count $C_{new}$ set to the remainder of the division. This second procedure, however, requires additional time and relatively complex hardware to divide the rotation count C by (n+1) and set the new rotation count to the remainder of the division.

SUMMARY OF THE INVENTION

The problems identified above are in large part solved by a method and circuit for executing an overshifted rotate through carry instruction in as few as two cycles with minimal changes to existing ALU hardware. In one embodiment, the circuit and method generates an n-bit output operand and output carry flag which represents a result of rotating a combination of a first n-bit operand and a first carry flag by a selected number of bit positions in a selected direction, wherein the selected number of bit positions corresponds to a z-bit rotation count.

The n-bit output operand and output carry flag is generated by first rotating the combination of the first n-bit operand and the first carry flag in the selected direction by a first number of bit positions corresponding to the y least significant bits of the z-bit rotation count where y is selected so that $n=2^y$. This results in a second n-bit operand and a second carry flag. Thereafter, a combination of the second n-bit operand and the second carry flag is rotated in a direction opposite of the selected direction by a second number of bit positions corresponding to the z-y most significant bits of the z-bit rotation count. This results in the n-bit output operand and output carry flag.

In another embodiment, rotating the combination of the first n-bit operand and the first carry flag can be achieved by generating a first preconditioned word from the first n-bit operand and the first carry flag, and shifting the first preconditioned word in the selected direction by the first number of bit positions corresponding to the y least significant bits of the z-bit rotation count. The first preconditioned word is (2n+2) bits wide and is formed such that (1) the n most significant and n least significant bits of the first preconditioned word, equate to the first n-bit operand, and (2) the middle bit of the first preconditioned word equates to the first carry flag.

Rotating the combination of the second n-bit operand and the second carry flag can be achieved by first generating a second preconditioned word from the second n-bit operand and the second carry flag, and shifting the preconditioned word in the direction opposite the selected direction by the second number of bit positions corresponding to the z-y most significant bits of the z-bit rotation count. The second preconditioned word is generating by forming a second (2n+1) bit operand in which (1) the n most significant and n least significant bits of the second preconditioned word, equate to the second n-bit operand, and (2) where the middle bit of the second preconditioned word equates to the second carry flag.

One advantage of the present invention is that it performs an overshifted rotate through carry instruction.

Another advantage of the present invention is that it performs an overshifted rotate through carry instruction in two cycles.

Yet another advantage of the present invention is that it performs overshifted rotate carry through instructions in two clock signals without significant changes to existing microprocessor hardware.

BRIEF DESCRIPTION OF THE DRAWINGS

Other objects and advantages of the invention will become apparent upon reading the following detailed description and upon reference to the accompanying drawings in which.

Figure 2:
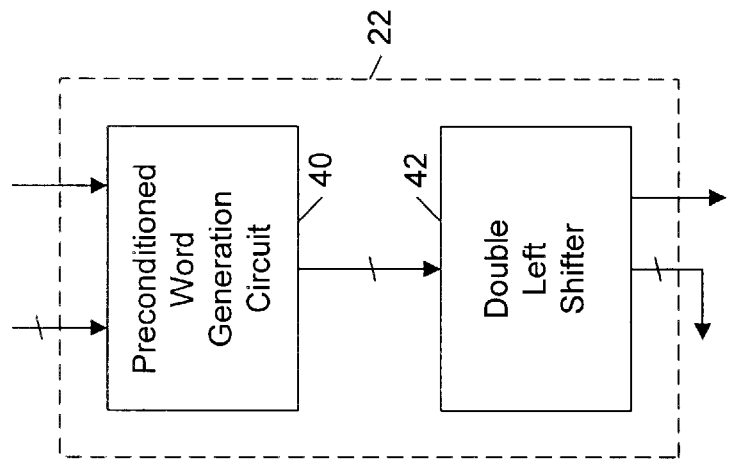
FIG. 2 is a block diagram of the rotate through carry circuit shown in FIG. 1.

While the present invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The present invention is configured to execute overshifted RCL or RCR instructions. These instructions process combinations of n-bit operands ($A_{n-1:0}$) and single bit carry flags (CF) according to z-bit rotation counts ($C_{z-1:0}$). Shown below are general x86 representations of the RCL and RCR instructions:

(3) RCL $A_{n-1:0}, C_{z-1:0}$, and (4) RCR $A_{n-1:0}, C_{z-1:0}$.

The present invention will be explained with respect to z=5 and n=8. However, it is to be understood that the present invention should not be limited thereto. Rather, the present invention is applicable to RCL and RCR instructions which operate on operands which have a greater or lesser number of bits and rotation counts which are greater or less than 5 bits wide. Further, the present invention will be described with respect to the RCR instruction, it being understood that the present invention is equally applicable to the RCL instruction.

One of ordinary skill in the art will recognize that overshifted RCR instructions can be performed by executing a pair of sequential RCR instructions. In other words, execution of instruction 4 above (with n=8 and z=5) can be achieved by executing the following two instructions in sequence:

(5) RCR $A_{7:0}, (C_{4:0}-C_{2:0})$, and (6) RCR $A'_{7:0}, C_{2:0}$, where $A'_{7:0}$ of the second sequential RCR instruction (6) represents the 8-bit result of the first sequential RCR instruction (5). This is because the addition of the rotation count ($C_{4:0}-C_{2:0}$) of the first sequential RCR instruction (5) and the rotation count ($C_{2:0}$) of the second sequential RCR instruction, equates to the original rotation count ($C_{4:0}$). One or ordinary skill in the art will also recognize that the first sequential RCR instruction can represent an overshift condition.

In general, one of ordinary skill in the art will recognize that:

(7) RCR $A_{n-1:0}, (C_{z-1:0}-C_{y-1:0})$=RCL $A_{n-1:0}, C_{z-1:y}$ where y can be defined in terms of n as follows:

(8) n=$2^y$

With n=8, and z=5, instruction (7) reduces to the following:

(9) $RCR_{7:0}, (C_{4:0}-C_{2:0})$=RCL $A_{7:0}, C_{4:3}$

In view of instruction 9 above, the pair of sequential instructions (5) and (6) can be expressed as:

(10) RCL $A_{7:0} C_{4:3}$, and

(11) RCR $A'_{7:0}, C_{2:0}$

Thus, the original overshifted RCR instruction can be performed by sequentially executing an RCL instruction followed by an RCR instruction.

Figure 1:
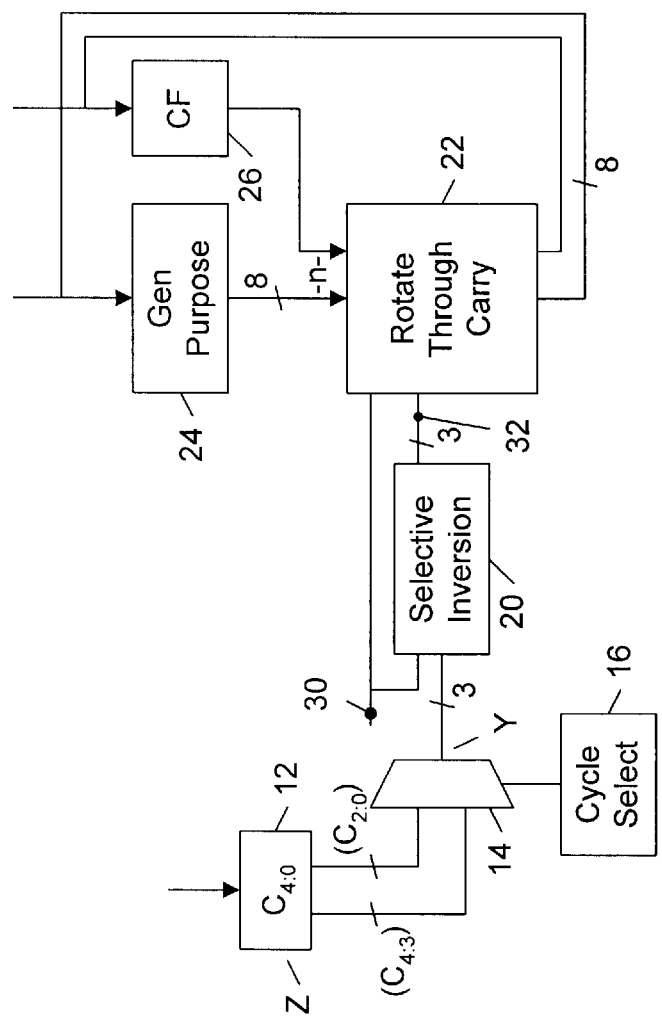
FIG. 1 is a block diagram showing a circuit for executing an overshifted rotate through carry instruction in accordance with the present invention.

FIG. 1 is a block diagram of a circuit for executing instructions 10 and 11 in accordance with the present invention. FIG. 1 shows a count register 12 for storing the rotation count $C_{4:0}$, a multiplexer 14, cycle select circuit 16, a selective count inversion circuit 20, a rotate through carry circuit 22, a general purpose register for storing a first 8-bit operand ($A_{7:0}$), a second 8-bit operand ($A'_{7:0}$), or a result 8-bit operand ($A''_{7:0}$), and a carry flag register for storing a first bit carry flag (CF), a second carry flag (CF'), or a result carry flag (CF").

The circuit shown in FIG. 1 operates in a pair of sequential cycles to generate the 8-bit result operand ($A''_{7:0}$) and the result carry flag (CF") as a function of the first operand ($A_{7:0}$) and the first carry flag (CF). $A''_{7:0}$ and CF" represent the result of performing an overshifted rotation on the combination of the first 8-bit operand ($A_{7:0}$) and the first carry flag (CF). The resulting 8-bit operand ($A''_{7:0}$) and carry flag (CF") are stored in general purpose register 24 and carry flag register 26 for subsequent use by downstream circuitry (not shown).

Prior to execution of the first sequential cycle, the rotation count $C_{4:0}$ is stored within count register 12, the first 8-bit operand ($A_{7:0}$) is stored in general purpose register 24, and the first carry flag (CF) is stored within carry flag register 26. Additionally, cycle select 16 generates a logical one which directs multiplexer 14 to pass the two most significant bits ($C_{4:3}$) of the count in register 12 to selective count inversion circuit 20. It is noted that the inputs to multiplexer 14 are unequal in bit size. However, it is presumed that when multiplexer 14 passes the two most significant bits of $C_{4:0}$, multiplexer 14 generates a 3-bit output, the most significant bit of which represents a logical zero. Thus, in the first cycle, multiplexer 14 passes the two most significant bits of $C_{4:0}$, zero extended by one bit.

Rotate through carry circuit 22 operates in one of several distinct modes in accordance with control signals provided to direction control node 30 and count control node 32. In particular, rotate through carry circuit 22 can perform a rotate through carry left or a rotate carry through right on the combination of the 8-bit operand provided by general purpose register 24 and the single bit operand provided by carry flag 26, depending on a one bit signal provided to direction control node 30. Thus, rotate through carry circuit 22 operates as a rotate through carry right circuit when a logical one is provided to direction control node 30, and rotate through carry circuit 22 operates as a rotate through carry left circuit on a logical zero is provided to direction control node 30. Further, the number of bits rotated by rotate through carry circuit 22, either left or right, is controlled by the 3-bit count provided to count control node 32.

Selective count inversion circuit 20 is coupled to receive the 3-bit count provided by multiplexer 14 in addition to the direction control signal provided to node 30. Selective count inversion circuit 20 operates to selectively invert the 3-bit count provided by multiplexer 14 in accordance with the signal provided to node 30. If a logical zero is provided to node 30, selective count inversion circuit 20 operates to pass the 3-bit count uninvented. If a logical one is provided to node 30, selective count inversion circuit 20 operates to logical invert the 3-bit count provided thereto.

In the first cycle, the first 8-bit operand $A_{7:0}$ and the first carry flag CF are provided to rotate through carry circuit 22 via general purpose register 24 and CF register 26. Further, a logical zero is provided to the direction control node 30 and selective count inversion circuit 20. In response to receiving the logical zero, selective count inversion circuit 20 operates to pass the two most significant bits $C_{4:3}$ zero extended by one bit, to rotate through carry circuit 22. In response, rotate through carry circuit 22 performs a rotate through carry left operation on $A_{7:0}$ and CF using a count equal to $C_{4:3}$ zero extended by one bit. Rotate through carry circuit 22 generates the second 8-bit operand $A'_{7:0}$ and second carry flag CF' in response thereto. The second 8-bit operand $A'_{7:0}$ is stored in general purpose register 24. The second carry flag CF' is stored in carry flag register 26.

In the second sequential cycle, cycle select circuit 16 issues a logical one which causes multiplexer 14 to pass the three least significant bits $C_{2:0}$ to selective count inversion circuit 20. Also, in the second cycle, a logical one is provided to selective count inversion circuit 20 via direction control node 30. Selective count inversion circuit 20 operates to logically invert $C_{2:0}$ passed by multiplexer 14.

As noted above, general purpose register 24 is loaded with the second 8-bit operand $A'_{7:0}$ upon completion of the first sequential cycle. Additionally, CF register 26 is loaded with the second carry flag CF' upon completion of the first sequential cycle'. In the second cycle, rotate through carry circuit 22 performs a rotate through carry right on the second 8-bit operand stored in general purpose register 24 and the second carry flag stored in register 26 in accordance with the logical zero provided to direction control node 30 and the inverted count provided by selective count inversion circuit 20. In response, rotate through carry circuit 22 generates the 8-bit result operand $A''_{7:0}$ and the result carry flag CF'', both of which are stored within general purpose register 24 and carry flag register 26, respectively.

FIG. 2 shows one embodiment of the rotate through carry circuit 22 shown in FIG. 1. FIG. 2 shows a preconditioned word generation circuit 40 coupled to a double left shifter 42. It is to be noted, however, that rotate through carry circuit 22 of FIG. 1 is not to be limited to what is shown in FIG. 2.

Preconditioned word generation 40 is configured to receive the first or second 8-bit operand ($A_{7:0}$ or $A'_{7:0}$) and the first or second carry flag (CF or CF') depending upon which of the two sequential cycles is currently executing. In the first cycle, preconditioned word generation circuit 40 generates a first 17-bit preconditioned word as a function of the first 8-bit operand $A_{7:0}$ and the first carry flag CF. The n most significant and n least significant bits of the first 17-bit preconditioned word equal the first 8-bit operand $A_{7:0}$. The middle bit of the 17-bit preconditioned word equates to the first carry flag CF. In the second sequential cycle, preconditioned word generation circuit 40 again generates a second 17-bit preconditioned word as a function of the second 8-bit operand $A'_{7:0}$ and the second carry flag CF'. In the second cycle, the n most significant and n least significant bits of the second 17-bit preconditioned word equates to the second 8-bit operand $A'_{7:0}$. Further, the middle bit of the second 17-bit preconditioned word equates to the second carry flag CF'.

Double left shifter 42 has 17 inputs, direction control node 30, count control nodes 32a, 32b, and 32c, and nine outputs. The 17 inputs are configured to receive either the first or second 17 bit preconditioned word from preconditioned word generation circuit 40. The n most significant outputs of double left shifter 42 generate either the second 8-bit operand $A'_{7:0}$ or the result operand $A''_{7:0}$ depending on the cycle of operation. The least significant output of double left shifter 42 generates either the second carry flag CF' or the result carry flag CF''. Although not shown in FIG. 2, general purpose register 24 is configured to receive the output of the 8 most significant bits of double left shifter 42. Similarly, CF register 26 is configured to receive the result generated by the least significant output of double left shifter 42.

Figure 3:
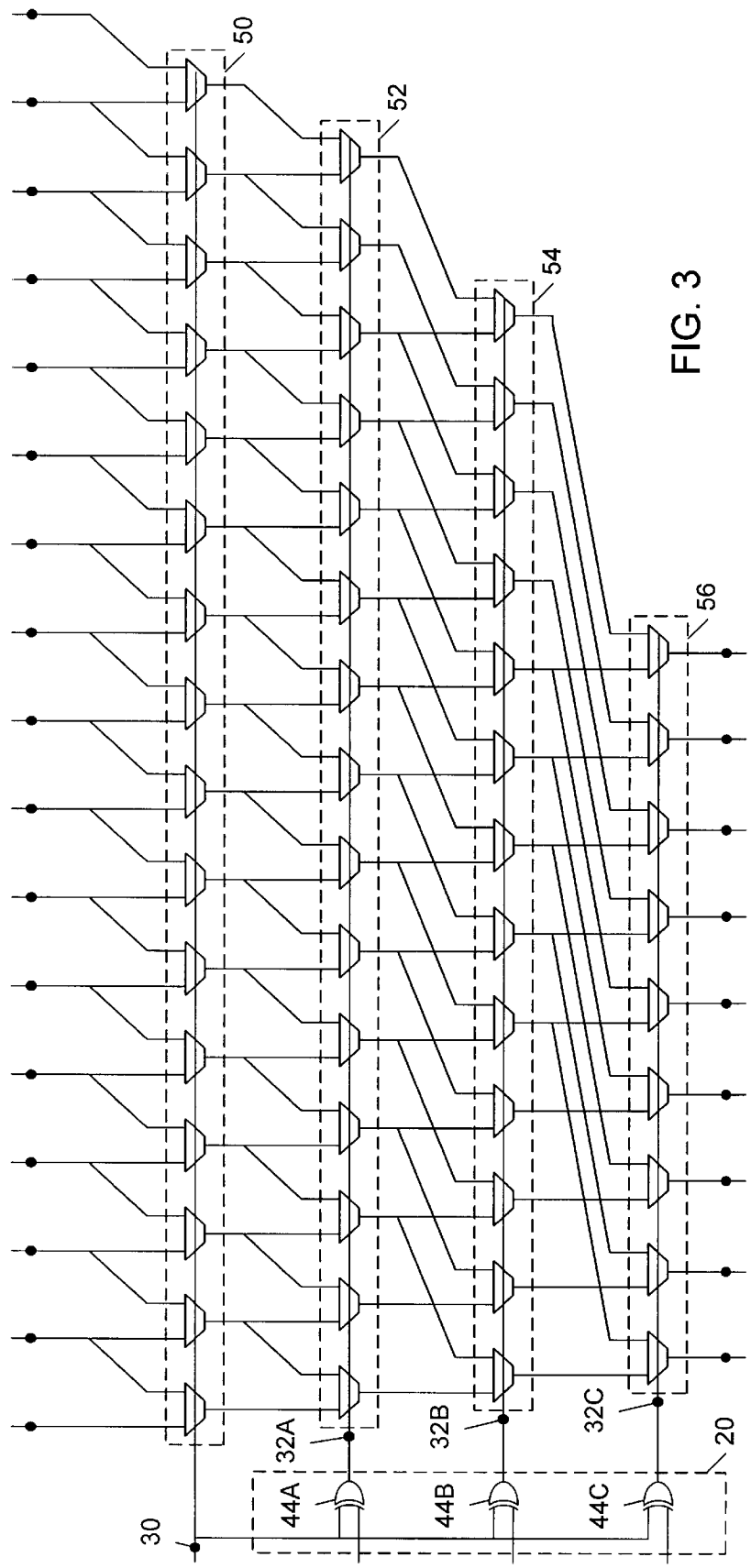
FIG. 3 is a block diagram of the double left shifter circuit and selective count inversion circuit shown in FIGS. 1 and 2, and, FIG. 4 is a block diagram showing an alternative circuit for executing an overshifted rotate through carry instruction in accordance with the present invention.

FIG. 3 is the schematic diagram of one embodiment of the double left shifter 42 shown in FIG. 1 and the selective count inversion circuit 20 of FIG. 1. In this embodiment, the selective count inversion circuit 20 includes XOR gates 44a, 44b, and 44c, which in turn are coupled, respectively, to counter control nodes 32a, 32b, and 32c. Each XOR gate 44 has a pair of inputs, the first of which is coupled to receive the control signal provided to direction control node 30. The second input of each XOR gate 44 is coupled to receive a corresponding bit provided by multiplexer 14 (not shown in FIG. 3). In the first cycle, the second input of XOR gate 44a receives $C_3$, the second input of XOR gate 44b receives $C_4$, and the second input of XOR gate 44c receives a logical zero. In the first cycle, as noted above, the first input of each XOR gate 44 receives a logical zero thereby causing XOR gates 44 to pass the bits provided to their second inputs without inversion. Thus, XOR gates 44a–c provide the two most significant bits of the rotation count stored within register 12, zero extended by one bit, to nodes 32a–c. In the second cycle, a logical one is provided to control node 30 while the second input of XOR gate 44a receives $C_0$, the second input of XOR gate 44b receives $C_1$, and the second input of XOR gate 44c receives $C_2$. With a logical one received at its first input, each of the XOR gates 44a–c operate to invert the bits provided to their second inputs. Thus, XOR gates 44a–c provide the three least significant bits of the rotation count stored within register 12 to nodes 32a–c, logically inverted.

Double left shifter 42 includes a first set of multiplexers 50, a second set of multiplexers 52, a third set of multiplexers 54, and a fourth set of multiplexers 56. The first set of multiplexers 50 receive the 17-bit preconditioned word from the preconditioned word generation circuit 40. In response to a logical one received at direction control node 30, multiplexers 50 operate to pass the 16 least significant bits of the 17-bit preconditioned word. In response to a logical zero provided to direction control node 30, multiplexers 50 operate to pass the 16 most significant bits of the preconditioned word. Multiplexers 52 receive the 16-bit operand provided by multiplexers 50. In response to a logical one provided to count control node 32a, multiplexers 52 operate to pass the 15 least significant bits of the 16 bit operand provided by multiplexers 50. In response to a logical zero provided to count control 32a, multiplexers 52 operate pass the 15 most significant bits of the 16-bit result operand provided by multiplexers 50. In response to a logical one received at counter control node 32b, multiplexers 54 operate to pass the 13 least significant bits of the 15 bit operand provided by multiplexers 52. In response to a logical zero provided to counter control node 32b, multiplexer 54 operate to pass the 13 most significant bits of the 15-bit result provided by multiplexers 52. In response to a logical one provided to counter control node 32c, multiplexers 56 operate to pass the nine least significant bits of the 13-bit result provided by multiplexers 54. In response to a logical zero provided to counter control node 32c, multiplexers 56 operate to pass the nine most significant bits of the 13-bit result provided by multiplexers 54.

The eight most significant multiplexers 56 provide either the second 8-bit operand $A'_{7:0}$ or the 8-bit result operand $A''_{7:0}$ depending upon the cycle in which the double left shifter 42 is executing. Similarly, the least significant multiplexer 56 generates the second carry flag CF' or the result carry flag CF'' again depending upon which cycle the double left shifter is executing.

Double left shifter 42 operates under the well-known principle that shifting an operand right by a particular shift count can be accomplished by shifting the same operand left by the negative of the particular shift count. In two's complement notation, the negative of the particular shift count equates to adding one to an inversion of the particular shift count. The double left shifter 42 and selective count inversion circuit 20 implements this well-known principle. Namely, XOR gates 44 invert the count provided to their second inputs when a logical one (indicating a right shift) is provided to direction control node 30. The first set of multiplexers 50 of double left shifter 42 shifts left by one the operand provided thereto in response to a logical one provided to direction control node 30. This has the same affect of adding one to an inversion of the shift count provided to multiplexers 44.

As noted above, rotate through carry circuit 22 can be implemented with the double left shifter 42 shown in FIG. 3. Copending applications Ser. Nos. 08/995,259 now U.S. Pat. No. 5,491,786 and 08/994,816 now U.S. Pat. No. 6,006,244 (filed Dec. 19, 1997) relate to method and circuits for shifting or rotating operands of multiple size. These copending applications are commonly assigned and incorporated herein by reference. It is noted that the circuits disclosed in these copending applications, with a slight modification to insert the carry flag bit, could implement the operation of double left circuit 42 shown in FIG. 3.

Figure 4:
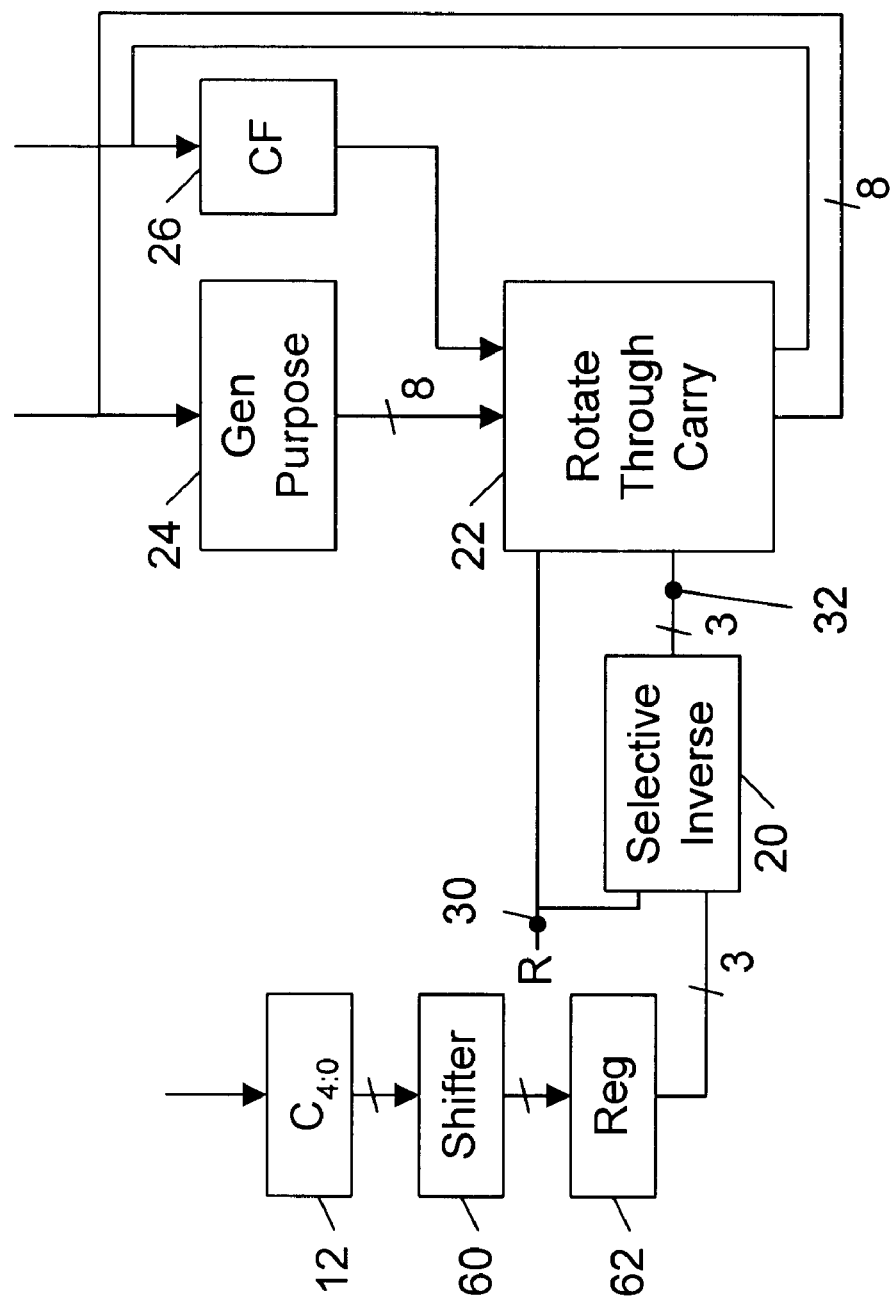

FIG. 4 shows an alternative embodiment to the circuit shown in FIG. 1. The circuit shown in FIG. 4 is similar to that shown in FIG. 1 except with the multiplexer 14 and cycle select circuit 16 replaced by a shifter 60 and register 62. More particularly, shifter 60 is configured to receive the 5-bit rotation count $C_{4:0}$ from count register 12. In the first cycle, shifter 60 shifts the 5-bit rotation count right by three bits, the result of which is stored in register 62. The shift in the first cycle occurs with zero fill. The three least significant bits from register 62 are provided to selective count inversion circuit 20. In the second cycle, the 5-bit rotation count $C_{4:0}$ is passed by shifter 60 and stored in register 62. Thereafter, the three least significant bits from register 62 is provided to selective count inversion circuit 20. In this embodiment, the cycles of the example are reversed.

Figure 5:
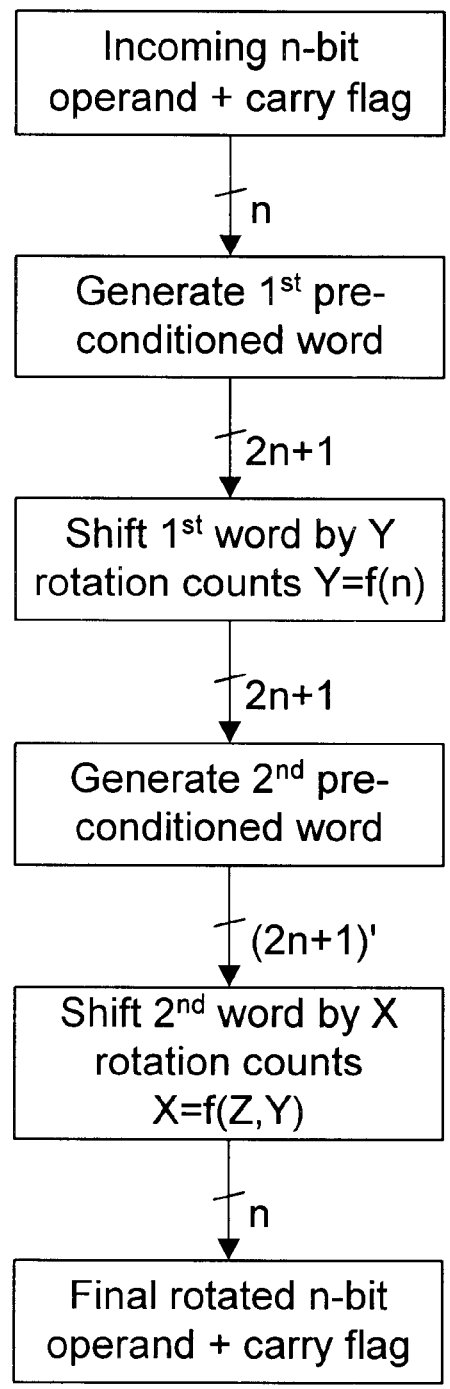
FIG. 5 is a flow diagram illustrating one embodiment of a method for executing an overshifted rotate through carry instruction.

FIG. 5 shows one embodiment of a method for executing an overshifted rotate through carry instruction.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. In a data processing system, a method of generating a n bit output operand and an output carry flag, wherein the n bit output operand and output carry flag represent a result of rotating a combination of a first n bit operand and a first carry flag by a selected number of bit positions in a selected direction, wherein the selected number of bit positions corresponds to a z bit rotation count, the method comprising the steps:

rotating the combination of the first n bit operand and the first carry flag in the selected direction by a first number of bit positions corresponding to y least significant bits of the z bit rotation count, wherein rotating the combination of the first n bit operand and the first carry flag produces a second n bit operand and a second carry flag, and;

rotating a combination of the second n bit operand and the second carry flag in a direction opposite the selected direction by a second number of bit positions corresponding to z-y most significant bits of the z bit rotation count, wherein rotating the combination of the second n bit operand and the second carry flag produces the n bit output operand and output carry flag.

2. The method of claim 1 wherein rotating the combination of the first n bit operand and the first carry flag comprises the steps:

generating a first preconditioned word from the first n bit operand and the first carry flag, and;

shifting the first preconditioned word in the selected direction by the first number of bit positions corresponding to y least significant bits of the z bit rotation count.

3. The method of claim 2 wherein generating the first preconditioned word comprises forming a first (2n+1) bit operand, wherein the n most significant and n least significant bits of the first (2n+1) bit operand equate to the first n bit operand, and wherein the middle bit of the first (2n+1) bit operand equates to the first carry flag.

4. The method of claim 1 wherein rotating the combination of the second n bit operand and the second carry flag comprises the steps:

generating a second preconditioned word from the second n bit operand and the second carry flag, and;

shifting the second preconditioned word in the direction opposite the selected direction by the second number of bit positions corresponding to x least significant bits of the z bit rotation count.

5. The method of claim 4 wherein generating the second preconditioned word comprises forming a second (2n+1) bit operand, wherein the n most significant and n least significant bits of the second (2n+1) bit operand equate to the second n bit operand, and wherein the middle bit of the second (2n+1) bit operand equates to the second carry flag.

6. The method of claim 1 wherein y is selected as a function of n.

7. The method of claim 6 wherein y is selected so that $n=2^y$.

8. In a data processing system, a rotation circuit comprising:

a register for storing a z bit rotation count;

a first circuit coupled to the register and configured to receive a first n bit operand and a first carry flag, wherein the first circuit is configured to generate a second n bit operand and a second carry flag representing a result of rotating a combination of the first n bit operand and the first carry flag a first number of bit positions in a selected direction, wherein the first number of bit positions corresponds to y least significant bits of the z bit rotation count stored in the register, and;

a second circuit coupled to the register and the first circuit, wherein the second circuit is configured to receive the second n bit operand and the second carry flag, wherein the second circuit is configured to generate an n bit output operand and an output carry flag representing a result of rotating a combination of the second n bit operand and the second carry flag a second number of bit positions in a direction opposite the selected direction, wherein the second number of bit positions corresponds to z-y most significant bits of the z bit rotation stored in the register.

9. The circuit of claim 8 wherein y is selected as a function of n.

10. The circuit of claim 9 wherein y is selected so that $n=2^y$.

11. In a data processing system, a circuit comprising:

a first register for storing a n bit operand;

a second register for storing a carry flag;

a third register for storing a z bit rotation count;

a rotation circuit coupled to the first, second, and third registers, wherein the rotation circuit is configured to generate a first n bit operand and a first carry flag, the first n bit operand and first carry flag representing a result of rotating a combination of the n bit operand and carry flag a first number of bit positions in a selected direction, and wherein the rotation circuit is configured to generate a second n bit operand and a second carry flag, the second n bit operand and second carry flag representing a result of rotating the combination of the n bit operand and carry flag a second number of bit positions in a direction opposite the selected direction;

wherein the first number of bit positions corresponds to y least significant bits of the z bit rotation count stored within the third register, and the second number of bit positions corresponds to the z-y most significant bits of the z bit rotation count stored within the third register.

12. The circuit of claim 11 wherein y is selected as a function of n.

13. The circuit above claim 12 wherein y is defined as $n=2^y$.

14. The circuit of claim 12 further comprising:

a shifter coupled between and in data communication with the third register and the rotation circuit, wherein the shifter is configured to receive and right shift the z bit rotation count by y bits;

a fourth register coupled between and in data communication with the shifter and the rotation circuit, wherein the fourth register is configured to store a result of shifting z bit rotational count right by y bits.

* * * * *